United States Patent
Kakkar et al.

(10) Patent No.: US 10,755,712 B2
(45) Date of Patent: Aug. 25, 2020

(54) AUTOMATED EXECUTION OF COMPUTER SOFTWARE BASED UPON DETERMINED EMPATHY OF A COMMUNICATION PARTICIPANT

(71) Applicant: FMR LLC, Boston, MA (US)

(72) Inventors: Samir Kakkar, Karnataka (IN); Hilary Lex, Tucson, AZ (US); Neha Dave, Karnataka (IN); Richa Srivastava, Karnataka (IN)

(73) Assignee: FMR LLC, Boston, MA (US)

( * ) Notice: Subject to any disclaimer, the term of this patent is extended or adjusted under 35 U.S.C. 154(b) by 164 days.

(21) Appl. No.: 16/163,461

(22) Filed: Oct. 17, 2018

(65) Prior Publication Data

US 2020/0126545 A1  Apr. 23, 2020

(51) Int. Cl.

| | |
|---|---|
| *G10L 15/25* | (2013.01) |
| *G10L 15/22* | (2006.01) |
| *G10L 25/63* | (2013.01) |
| *G06K 9/00* | (2006.01) |
| *G10L 15/30* | (2013.01) |
| *G10L 15/19* | (2013.01) |

(Continued)

(52) U.S. Cl.
CPC .......... *G10L 15/22* (2013.01); *G06K 9/00302* (2013.01); *G10L 15/19* (2013.01); *G10L 15/30* (2013.01); *G10L 25/63* (2013.01); *G10L 2015/088* (2013.01); *H04M 3/5191* (2013.01); *H04M 2203/401* (2013.01)

(58) Field of Classification Search
CPC ....... G10L 15/25; G10L 15/197; G10L 15/00; G10L 15/06; G10L 15/08; G10L 15/14; G10L 15/16; G10L 15/18; G10L 15/1815; G10L 15/1822; G10L 15/20; G10L 15/22; G10L 15/24; G10L 15/26; G10L 2015/225; G10L 2015/00; G10L 2015/06; G10L 2015/08; G10L 2015/22; G10L 2015/226; G10L 2015/228
USPC .... 704/235, 231, 232, 236, 246, 270.1, 276, 704/275
See application file for complete search history.

(56) References Cited

U.S. PATENT DOCUMENTS

9,812,151 B1    11/2017 Amini et al.
10,015,316 B1 *  7/2018 Horne ................. G06Q 30/01
(Continued)

*Primary Examiner* — Qi Han
(74) *Attorney, Agent, or Firm* — Proskauer Rose LLP (57) ABSTRACT

Methods and apparatuses are described for automated execution of computer software based upon determined empathy of a communication participant. A server captures a digitized voice segment from a remote computing device. The server analyzes vocal cues of the digitized voice segment to generate a voice empathy score. The server converts speech in the digitized voice segment into text and determines empathy keywords in the text to generate a keyword empathy score. The server captures digitized images of the participant's face and analyzes physical expressions of the face to identify emotions and generate a facial empathy score. The server generates an overall empathy confidence score for the communication participant based upon the voice empathy score, the keyword empathy score, and the facial empathy score. The server generates recommended changes for the user based upon the overall empathy confidence score and executes a software application that displays the recommended changes.

16 Claims, 8 Drawing Sheets

(51) Int. Cl.
G10L 15/08 (2006.01)
H04M 3/51 (2006.01)

(56) References Cited

U.S. PATENT DOCUMENTS

2012/0052476 A1* 3/2012 Graesser ................. G09B 7/04
        434/362
2016/0224869 A1   8/2016 Clark-Polner
2017/0213190 A1   7/2017 Hazan
2017/0344713 A1  11/2017 Riistama et al.
2018/0317840 A1* 11/2018 Ben-Kiki ................ G06F 40/30

* cited by examiner

Linear Model Function for Facial Confidence Score

- Pass empathy values(between 0 to 1) from Facial API to linear model (402)

function LinearModel(angerValue, joyValue, disgustValue, fearValue, neutralValue, sadnessValue, surpriseValue)

If feedback loop not implemented

Fixed weightage for all that is w1,w2,w3,w4,w5,w6,w7 = 1 (404)

Final Facial confidence score = (angerValue*w1 + joyValue*w2 + disgustValue*w3 + fearValue*w4 + neutralValue*w5 + sadnessValue*e6 + surpriseValue*w7)/ Number of facial emotions (406)

StoreFacialHistoricalData(angerValue, joyValue, disgustValue, fearValue, neutralValue, sadnessValue, surpriseValue, finalFacialConfidenceScore) (408)

else finalFacialConfidenceScore = LinearRegressionFacialModel (angerValue, joyValue, disgustValue, fearValue, neutralValue, sadnessValue, surpriseValue) (410)

endIf

Return finalFacialConfidenceScore end function

- Store Historical Data (602)
  ○ Pass *facialIndependentVariable* and *facialDependentVariable* to Empathy Indicator Database
    function StoreFacialHistoricalData *(facialIndependentVariable and facialDependentVariable )*
        Insert *facialIndependentVariable and facialDependentVariable* to EmpathyDB
    end function

- Linear Regression Model Function for Facial Confidence Score (604)
  ○ Pass voice score (0 to 1), facial score (0 to 1), keyword score (0 or 1) to model
    function LinearRegressionFacialModel *(empathyInDependentVariable )*
        DNNFacialModel dnnFacialModelInstance = Get the instance of DNNFacialModel
        facialConfidenceScore = dnnFacialModelInstance.predict*(facialIndependentVariable)* # TensorFlow predict function
        Return facialConfidenceScore
    end function

- Creating DNNFacialModel – Deep Neural Network model (606)
  1. Load/Read historical data and test data from EmpathyDB/csv format *(facialIndependentVariable and facialDependentVariable* )
  2. Identify dependent and independent variables from the columns in database.
  3. Define and create the DNNModel using Tensorflow's standard LinearRegressor
  4. Train the model using historical data
  5. Evaluate the Model using test data (This will provide accuracy of the Model)
  6. Repeat 3 to 5 till the model reaches 95% accuracy
  7. DNNModel is ready for production

**facialIndependentVariable* - angerValue, joyValue, disgustValue, fearValue, neutralValue, sadnessValue, surpriseValue
**facialDependentVariable* – finalFacialConfidenceScore
***DNN* – Deep Neural Network

FIG. 6

| Input | | | | | | Output |
|---|---|---|---|---|---|---|
| angerValue | joyValue | disgustValue | fearValue | neutralValue | sadnessValue | surpriseValue | FinalFacialConfidenceScore |
| 9.29E-06 | 0.066307 | 3.16E-05 | 0.00058964 | 0.0056 | 7.45E-06 | 0.9273863 | 0.6 |
| 4.99E-08 | 0.973251 | 5.25E-09 | 5.61E-10 | 0.0262 | 7.47E-07 | 1.32E-06 | 9.40E-01 |
| 0.09557262 | 9.00E-08 | 0.68476456 | 4.04E-06 | 0.0021 | 0.21358767 | 6.35E-06 | 0.4 |
| 0.00415683 | 0.002226 | 0.00064389 | 0.00034323 | 0.9824 | 0.0073315 | 0.0019697 | 0.7 |
| 0.7736902 | 7.79E-09 | 0.19634283 | 0.00070644 | 0.0169 | 0.00104752 | 0.0005562 | 0.2 |

FIG. 7

- Store Historical Data (802)
  - Pass voice score (0 to 1), facial score (0 to 1), keyword score (0 or 1), final score(0 to 1) to Empathy Indicator Database
    function StoreHistoricalData( *empathyIndependentVariable* , *empathyDependentVariable* )
      Insert *empathyIndependentVariable* , *empathyDependentVariable* to EmpathyDB
    end function

- Linear Regression Model Function for Final Score (804)
  - Pass voice score (0 to 1), facial score (0 to 1), keyword score (0 or 1) to model
    Function LinearRegressionModel(*empathyIndependentVariable* )
      DNNModel dnnModelInstance = Get the instance of DNNModel
      finalConfidenceScore = dnnModelInstance.predict(*empathyIndependentVariable*) # TensorFlow predict function
      Return finalConfidenceScore
    end function

- DNNModel Function for Final Score (806)
  1. Load/Read historical data from database/csv format (*empathyIndependentVariable* , *empathyDependentVariable* )
  2. Identify dependent and independent variables from the columns in database.
  3. Create the DNNModel using Tensorflow's Standard LinearRegressor
  4. Train the model using historical data
  5. Evaluate the Model using test data (This will provide accuracy of the Model)
  6. Repeat 3 to 5 till the model reaches 95% accuracy
  7. DNNModel is ready for production \**empathyIndependentVariable* – voiceScoreValue, facialScoreValue, keywordScoreValue
\**empathyDependentVariable* – finalConfidenceScore
\*\*\*DNN – Deep Neural Network

FIG. 8

AUTOMATED EXECUTION OF COMPUTER SOFTWARE BASED UPON DETERMINED EMPATHY OF A COMMUNICATION PARTICIPANT

TECHNICAL FIELD

This application relates generally to methods and apparatuses, including computer program products, for automated execution of computer software based upon determined empathy of a communication participant using artificial intelligence-based speech recognition and facial recognition techniques.

BACKGROUND

Typically, customer service representatives (CSRs) in environments such as call centers have a computer workstation that acts as a hub for a multitude of software applications (e.g., telephony, email, knowledge base, customer relationship management, sales/order processing, marketing, inventory management, and so forth) that enable the agent to effectively respond to digital communications from a customer base. When a customer initiates a communication session with the CSR at the call center (for example, a voice call or video call call), the CSR may execute a variety of software applications on his or her workstation during the communication session to respond to the caller's questions. Typically, the CSR conducts a verbal conversation with the caller to understand the reason for the call and to provide associated information to the caller. In cases when a caller is reaching out to the CSR with a sensitive inquiry or problem, the level of empathy displayed by the CSR is crucial to improving the customer experience and producing a positive resolution to the situation.

However, it is very difficult for CSRs to understand whether they are acting in a manner that exhibits empathy and to improve their behavior to provide more empathetic communications with the callers. Generally, this type of study and improvement is only the result of many years of experience, and there is no reliable, accurate computerized methodology to automatically analyze a CSR's behavior during a communication session to determine a confidence level in the CSR's empathy and to provide real-time feedback and suggestions to the CSR in ways that they could improve their behavior. Generally, existing computing systems are equipped to only analyze

SUMMARY

Therefore, what is needed is a system and method for leveraging advanced computing techniques, such as machine learning and artificial intelligence algorithms, to automatically analyze digital audio files of a user's voice characteristics and patterns, to automatically analyze text files of the user's speech to determine the content of specific keywords employed by the user, and to automatically analyze digital images of the user's facial expressions—all to understand whether the user is exhibiting a desired level of empathy during his or her communications with a remote user. The techniques described herein provide advantageous processes to leverage both real-time and historical data relating to the user's voice, keywords, and facial expression in generating a confidence value of the user's empathy during communications, and based upon the confidence value, to automatically launch software applications on the user's workstation to display recommended actions to the user with respect to changing his or her behavior to be more empathetic. In addition, the computerized machine learning framework implemented by the systems and methods described herein leverage a feedback loop based upon both historical data and real-time data to automatically increase the accuracy of the machine learning system.

The invention, in one aspect, features a system for automated execution of computer software based upon determined empathy of a communication participant using artificial intelligence-based speech recognition and facial recognition techniques. The system includes a remote computing device of the communication participant and a server computing device coupled to the remote computing device via a network connection. The server computing device includes a memory for storing programmatic instructions and a processor that executes the programmatic instructions. The server computing device captures a digitized voice segment from the remote computing device, the digitized voice segment corresponding to speech submitted by the communication participant during a digital communication session. The server computing device analyzes one or more vocal cues of a waveform of the digitized voice segment to generate a voice empathy score for the digitized voice segment. The server computing device converts the speech in the digitized voice segment into text and extracts a set of keywords from the text. The server computing device determines one or more empathy keywords in the extracted set of keywords and generates a keyword empathy score based upon the empathy keywords. The server computing device captures, via a camera coupled to the remote computing device, digitized images of the communication participant's face during the digital communication session. The server computing device analyzes one or more physical expressions of the participant's face in the digitized images to identify one or more emotions of the participant and generating a facial empathy score for the digitized images. The server computing device generates, using an artificial intelligence classification model, an overall empathy confidence score for the participant based upon the voice empathy score, the keyword empathy score, and the facial empathy score. The server computing device generates recommended changes to (i) a physical expression of the participant's face or (ii) vocal cues of the participant's speech based upon the overall empathy confidence score. The server computing device executes a computer software application that displays the recommended changes to the participant.

The invention, in another aspect, features a computerized method of automated execution of computer software based upon determined empathy of a communication participant using artificial intelligence-based speech recognition and facial recognition techniques. A server computing device captures a digitized voice segment from a remote computing device, the digitized voice segment corresponding to speech submitted by a communication participant during a digital communication session. The server computing device analyzes one or more vocal cues of a waveform of the digitized voice segment to generate a voice empathy score for the digitized voice segment. The server computing device converts the speech in the digitized voice segment into text and extracts a set of keywords from the text. The server computing device determines one or more empathy keywords in the extracted set of keywords and generates a keyword empathy score based upon the empathy keywords. The server computing device captures, via a camera coupled to the remote computing device, digitized images of the communication participant's face during the digital communication session. The server computing device analyzes one or more physical expressions of the participant's face in the digitized images to identify one or more emotions of the participant and generating a facial empathy score for the digitized images. The server computing device generates, using an artificial intelligence classification model, an overall empathy confidence score for the participant based upon the voice empathy score, the keyword empathy score, and the facial empathy score. The server computing device generates recommended changes to (i) a physical expression of the participant's face or (ii) vocal cues of the participant's speech based upon the overall empathy confidence score. The server computing device executes a computer software application that displays the recommended changes to the participant.

Any of the above aspects can include one or more of the following features. In some embodiments, generating an overall empathy confidence score comprises generating, using the classification model, a first empathy confidence score for the participant based upon the voice empathy score, the keyword empathy score, and the facial empathy score. If the first empathy confidence score is below a predetermined threshold, the server computing device trains, using an artificial intelligence neural network executing on the server computing device, a second artificial intelligence classification model using historical data comprising voice empathy scores, keyword empathy scores, and facial empathy scores, and overall empathy confidence scores previously determined by the server computing device. The server computing device executes the trained second classification model using the voice empathy score, the keyword empathy score, and the facial empathy score as input to generate the overall empathy confidence score for the participant. In some embodiments, executing the trained second classification model generates an accuracy value associated with the overall empathy confidence score.

In some embodiments, capturing a digitized voice segment comprises capturing a bitstream containing the digitized voice segment from the remote computing device as a speech file, and adjusting compression of the bitstream containing the digitized voice segment to enhance audio quality of the bitstream. In some embodiments, the one or more vocal cues of the waveform comprise a tone attribute, a pitch attribute, a volume attribute, and a speed attribute. In some embodiments, the server computing device analyzes one or more frequencies associated with the waveform to determine the one or more vocal cues of the waveform.

In some embodiments, converting the digitized voice segment into text comprises executing a speech recognition engine on a digital file containing the digitized voice segment to generate the text. In some embodiments, the server computing device analyzes the text using a grammar recognition engine to validate the text.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 8 is an example function workflow for the artificial intelligence linear regression classification model when determining the overall empathy confidence score.

DETAILED DESCRIPTION

Figure 1:
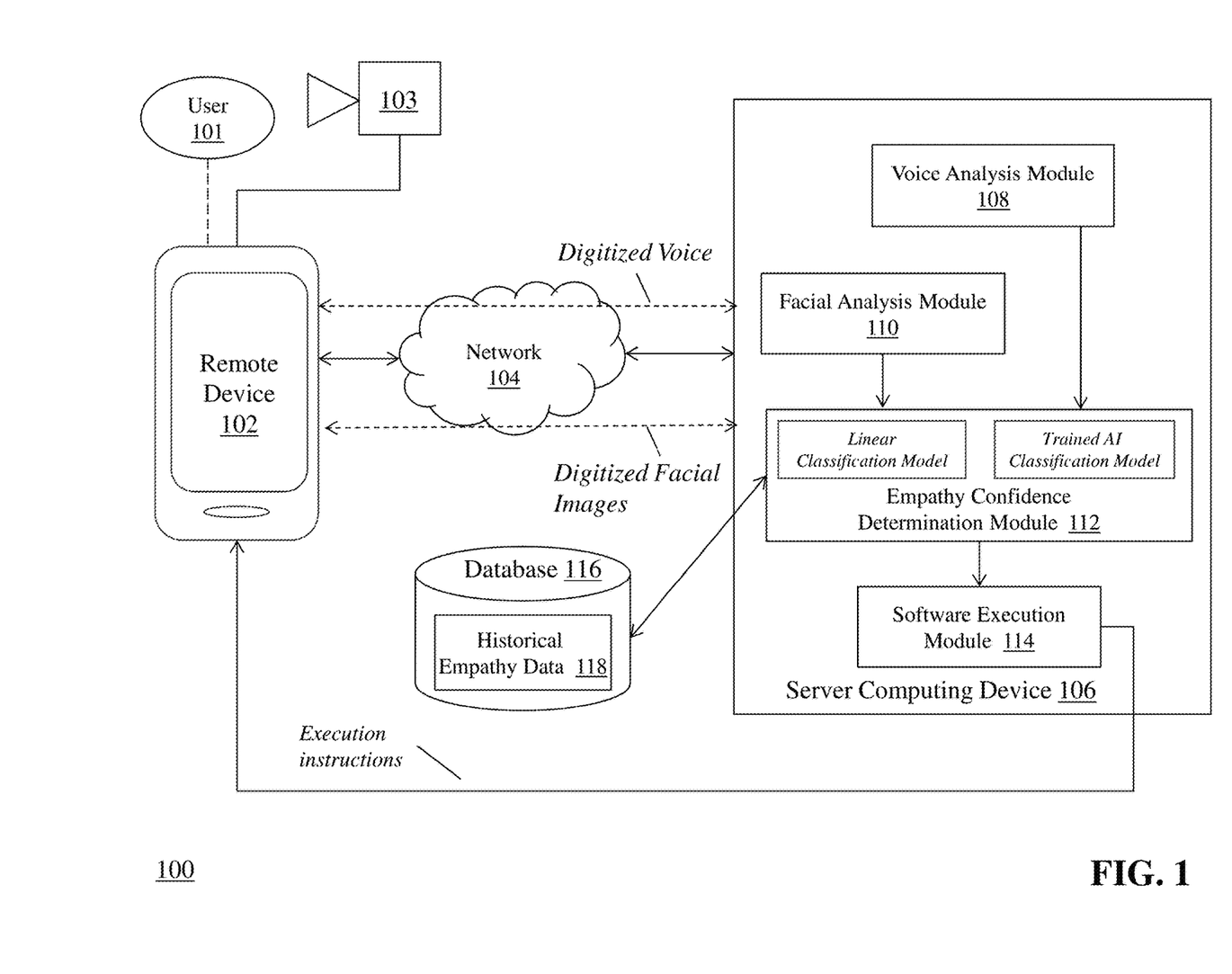
FIG. 1 is a block diagram of a system for automated execution of computer software based upon determined empathy of a communication participant using artificial intelligence-based speech recognition and facial recognition techniques.

FIG. 1 is a block diagram of a system 100 for automated execution of computer software based upon determined empathy of a communication participant using artificial intelligence-based speech recognition and facial recognition techniques. The system 100 includes a remote computing device 102, a camera 103, a communications network 104, a server computing device 106 that includes a voice analysis module 108, a facial analysis module 110, an empathy confidence determination module 112, and a software execution module 114, a database 116 that includes historical empathy data 118.

The remote computing device 102 communicates with the server computing device 106 via the communication network 104 as part of a communication session with, e.g., a client computing device (not shown). For example, a user 101 (i.e., a communication participant) of the remote computing device 102 can conduct a digital communication session (e.g., a voice call, a video call) with a user at the client computing device. In one embodiment, the user 101 is a customer service representative (CSR) in a call center that receives voice calls and/or video calls from customers and provides assistance and services to the customers. Example remote computing devices 102 can include, but are not limited to, a smart phone (e.g., Apple iPhone®, Windows®, and/or Android™-based device), a desktop/laptop computing device with telephony software, a telephone handset, or other similar devices.

The camera 103 is coupled to (or in some embodiments, embedded in) the remote computing device 102. The camera is configured to capture digital video and/or images of the facial expressions of the user at remote computing device 102 during the digital communication session and transmit the digital facial expressions to the server computing device 106 via network 104.

The communications network 104 enables the remote computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a computing device including specialized hardware and/or software modules that execute on a processor and interact with memory modules of the server computing device 106, to receive data from other components of the system 100, transmit data to other components of the system 100, and perform functions for automated execution of computer software based upon determined empathy of a communication participant using artificial intelligence-based speech recognition and facial recognition techniques as described herein. The server computing device 106 includes several computing modules 108, 110, 112, 114 that execute on the processor of the server computing device 106. In some embodiments, the modules 108, 110, 112, 114 are specialized sets of computer software instructions programmed onto one or more dedicated processors in the server computing device 106 and can include specifically-designated memory locations and/or registers for executing the specialized computer software instructions.

Although the modules 108, 110, 112, 114 are shown in FIG. 1 as executing within the same server computing device 106, in some embodiments the functionality of the modules 108, 110, 112, 114 can be distributed among a plurality of server computing devices. As shown in FIG. 1, the server computing device 106 enables the modules 108, 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112, 114 is described in detail below.

The database 116 is a computing device (or in some embodiments, a set of computing devices) coupled to the server computing device 106 and is configured to receive, generate, and store specific segments of data relating to the process of automated execution of computer software based upon determined empathy of a communication participant using artificial intelligence-based speech recognition and facial recognition techniques as described herein. In some embodiments, all or a portion of the database 116 can be integrated with the server computing device 106 or be located on a separate computing device or devices. The database 116 can comprise one or more databases configured to store portions of data used by the other components of the system 100, as will be described in greater detail below. An exemplary database 116 is MySQL™ available from Oracle Corp. of Redwood City, Calif.

The database 116 includes historical empathy data 118 which in some embodiments can be stored in a dedicated section of the database 116 and used by the server computing device 106 to train an artificial intelligence classification model in determining an empathy score for the user as described herein.

Figure 2:
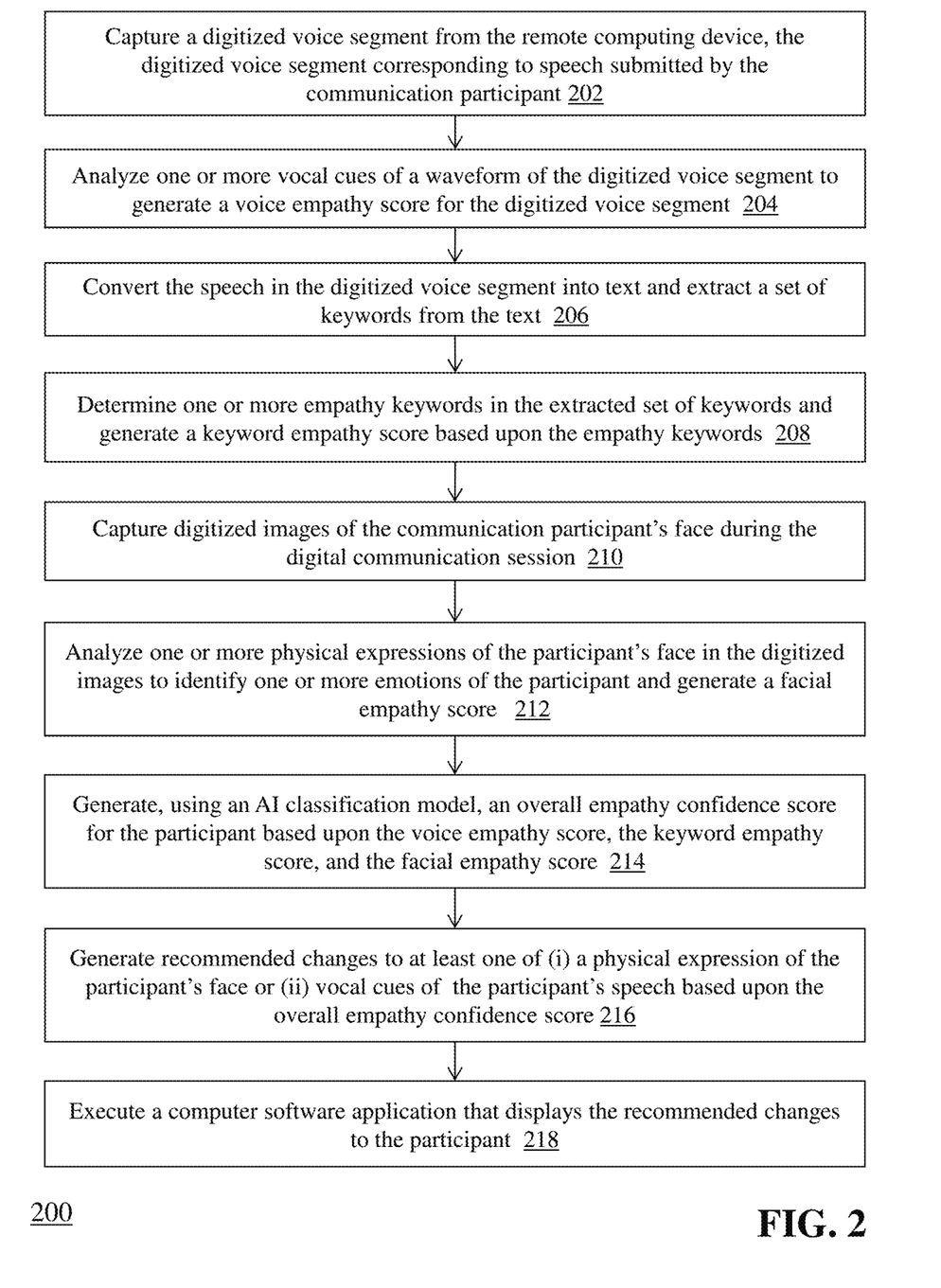
FIG. 2 is a flow diagram of a computerized method for automated execution of computer software based upon determined empathy of a communication participant using artificial intelligence-based speech recognition and facial recognition techniques.

FIG. 2 is a flow diagram of a computerized method 200 for computerized method for automated execution of computer software based upon determined empathy of a communication participant using artificial intelligence-based speech recognition and facial recognition techniques, using the system 100 of FIG. 1. The remote computing device 102 establishes a digital communication session (e.g., a voice call, a video call) via communications network 104 to a client computing device. Upon establishing the digital communication session, a user 101 at remote computing device 102 converses with a user at the client computing device while the remote computing device 102 captures digital segments of the user's 101 voice while the camera 103 captures digital video and/or images of the user's 101 face during the communication session.

The voice analysis module 108 captures (202) a digitized voice segment corresponding to speech submitted by user 101 during the communication session. For example, the user 101 may be discussing a question about certain products or services with a customer, the user 101 may be providing information about the customer's account, or the user 101 may be listening to and responding to a complaint from the customer. In some embodiments, the voice analysis module 108 captures, e.g., a digital bitstream of the voice call and parses the bitstream to locate the speech segments associated with the user 101. It should be appreciated that the voice analysis module 108 is capable of digitizing the voice segments, in the case that the segments are captured or otherwise received in non-digital form. The voice analysis module 108 can also perform functions to improve the audio quality of the digitized voice segments, such as adjusting compression, converting the segments to another format, reducing or eliminating background noise, and so forth. In some embodiments, the voice analysis module 108 stores the captured file(s) in database 112.

It should be appreciated that, in some embodiments, the voice analysis module 108 continuously captures digitized voice segments from the user 101 throughout the digital communication session and uses the digitized voice segments in the manner described herein. For example, the voice analysis module 108 can be configured to continuously capture and measure digitized voice segments according to user-defined settings (e.g., 10-second segments, 20-second segments, 60-second segments).

The voice analysis module 108 analyzes (204) one or more vocal cues of a waveform of the captured digitized voice segment(s) to generate a voice empathy score for the digitized voice segment(s). In one embodiment, the voice analysis module 108 executes an application programming interface (API) or similar software toolkit that generates a waveform of the digitized voice segment and analyzes certain characteristics of the waveform in order to determine whether a specific emotion can be imputed to the user 101 based upon the characteristics. For example, the voice analysis module 108 can evaluate characteristics such as pitch (in Hz), loudness (or sound pressure level) (in dB), timbre ascend time and timbre descend time (in seconds), time gaps in between words (in seconds), and so forth. Based upon values, or ranges of values, of each of the measured characteristics of the waveform, the voice analysis module 108 can determine one or more emotions (e.g., anger, happiness, sadness, compassion, panic) associated with the user's speech. For example, a digitized voice segment that has a waveform with a certain pitch (e.g., 1600 Hz), loudness (e.g., −25 dB), timbre ascend time (e.g., 0.15 seconds), timbre descend time (e.g., 0.12 seconds), and time gaps between words (e.g., 0.07 seconds) can indicate that the user is angry. One example of an API that can be used by the module 108 for this purpose is the Emotion Recognition API available from DeepAffects, Inc.

The voice analysis module 108 can assign the determined emotions to one or more portions of the digitized voice segment(s) and use the assigned emotions (either in aggregate or individually) to generate a voice empathy score for the voice segment(s). In one embodiment, the module 108 can determine a subscore between 0 (no empathy) and 1 (full empathy) for each emotion and calculate a voice empathy score for the voice segment based upon an aggregation of the subscores.

The voice analysis module 108 also converts (206) the speech in the digitized voice segment(s) into text and extracts a set of keywords from the text. In one embodiment, the module 108 utilizes a speech recognition API to convert the digital speech into, e.g., a plain text file and extracts a subset of the speech as keywords. For example, the module 108 can utilize two core functionalities to convert the voice segment into text: speech recognition and grammar analysis. In one example, the voice analysis module 108 can use a speech recognition library, such as the Speech Recognition API available from Microsoft Corporation or Cloud Speech-to-Text API available from Google, Inc., to convert the digitized speech file into text. In some embodiments, the voice analysis module 108 can leverage external resources, such as a grammar library accessible via the internet, in order to accurately determine the words and phrases contained within the digitized voice segment.

The voice analysis module 108 then analyzes (208) the text generated from the digitized voice segment to extract one or more keywords from the text. The module 108 can perform techniques such as stopword removal and context-specific word filtering in order to isolate specific keywords that correlate to, e.g., the user's 101 emotion and/or empathy toward the customer. Exemplary empathy keywords can include, but are not limited to, "I understand what you're saying," "I'm sorry to hear that," "Help me understand," "Thank you for explaining," "Tell me more about that," "If I were in your position, I'd feel the same way," "That would frustrate (or upset) me too," "I support you," "How does that make you feel," "That sounds upsetting (or frustrating)." In some embodiments, the module 108 can compare the extracted keywords against a known list of empathy keywords (e.g., in database 116) to determine whether the user 101 included any empathy keywords in his or her speech as part of the digital communication session. For example, the use of a larger number of empathy keywords and/or keywords that indicate deep empathy (e.g., have a specific empathy weight or rating) can indicate a higher level of empathy being expressed by the user 101. In another example, the use of few empathy keywords can indicate a lower level of empathy being expressed.

Upon isolating the empathy keywords, the voice analysis module 108 can generate (208) a keyword empathy score based upon the empathy keywords. In one example, the module 108 can use the following algorithm to determine the keyword empathy score:

$$\text{Keyword empathy score} = \frac{\text{sum(empathy score for each word or text segment)}}{\text{number of words or text segments}}$$

For example, the module 108 can determine an empathy score for each word (or text segment such as a phrase or sentence) in the digitized voice segment. The module 108 can add the empathy scores together and divide the total score by the number of words (or text segments) in the voice segment. If the keyword empathy score is above a predetermined threshold, the voice analysis module 108 can determine that the user 101 is expressing empathy during the communication session. The voice analysis module 108 can transmit the determined voice empathy score and keyword empathy score derived from the digitized voice segment to the empathy confidence determination module 112

Next, the facial analysis module 110 captures (210) digitized images of the user's 101 face during the digital communication session, using the camera 103 coupled to the remote computing device 102. In one example, the camera 103 automatically captures video and/or still images of the user's 101 face as he or she converses with a customer during the digital communication session, and transmits the captured digital images to the facial analysis module 110. The facial analysis module 110 can execute a facial emotion recognition API (e.g., Face API available from Microsoft Azure™ or Cloud Vision™ API available from Google, Inc.) against one or more of the captured digitized images to analyze (212) one or more physical expressions of the user's 101 face in the digitized images in order to identify one or more emotions of the user based upon, e.g., an arrangement and/or position of the user's specific facial features.

Figure 3A:
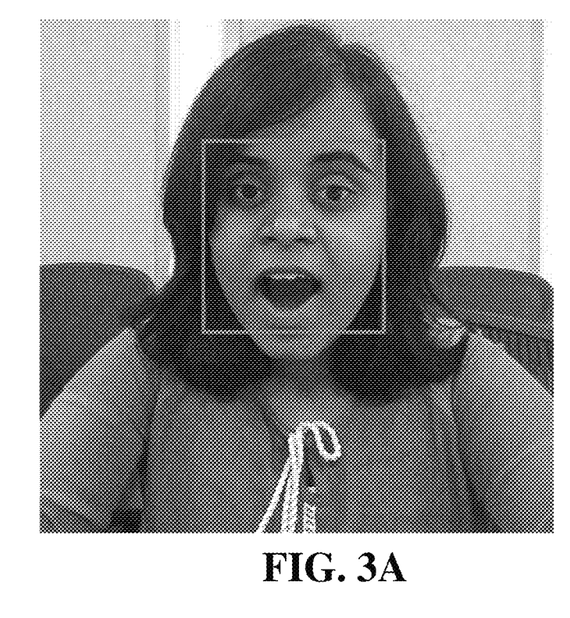
FIG. 3A is an example digitized image of a face expressing surprise.

In one example, the facial analysis module 110 can analyze a digitized image or video to generate a subscore for the image based upon a plurality of emotions, such as anger, joy, disgust, fear, neutral, sadness, and surprise. FIG. 3A is an exemplary digitized image of a face expressing surprise that is analyzed by the module 110. In the case of the image depicted in FIG. 3A, the module 110 can determine the following subscores:

| Emotion | Subscore |
|---|---|
| Anger | 0.00002 |
| Contempt | 0.00001 |
| Disgust | 0.00008 |
| Fear | 0.00001 |
| Happiness | 0.21243 |
| Neutral | 0.00523 |
| Sadness | 0.00001 |
| Surprise | 0.78221 |

Based on the above example, because surprise is associated with the dominant subscore, the module 110 can confidently determine that the emotion of the user is surprise.

Figure 3B:
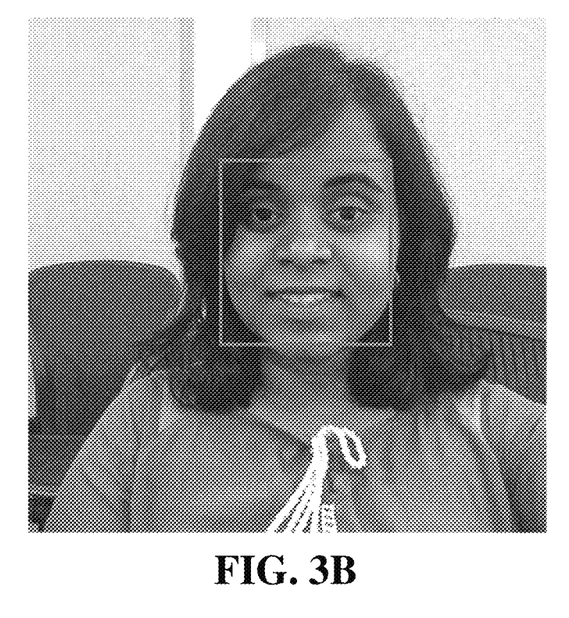
FIG. 3B is an example digitized image of a face expressing happiness.

FIG. 3B is an exemplary digitized image of a face expressing happiness that is analyzed by the module 110. In the case of the image depicted in FIG. 3B, the module 110 can determine the following subscores:

| Emotion | Subscore |
|---|---|
| Anger | 0.00001 |
| Contempt | 0.00003 |
| Disgust | 0.00000 |
| Fear | 0.00000 |
| Happiness | 0.99276 |
| Neutral | 0.00712 |
| Sadness | 0.00001 |
| Surprise | 0.00007 |

Based on the above example, because happiness is associated with the dominant subscore, the module 110 can confidently determine that the emotion of the user is happiness.

In some embodiments, the module 110 can apply one or more weights to the subscores (e.g., based upon evaluation of the vocal cues and/or keywords as described above)—for example, if the vocal cues and/or keywords indicate a particular emotion of the user, the facial analysis module 110 can weigh facial features and/or expressions associated with that emotion more strongly than other facial features associated with different emotions.

The facial analysis module 110 then generates (212) a facial empathy score for the digitized images and/or video. In one embodiment, the module 110 uses the subscores for the images as input to a linear classification model executed by the empathy confidence determination module 112. The linear classification model is a progressive/linear approach for modeling the relationship between a scaler-dependent variable (i.e., the subscores for each facial emotion as determined by the facial emotion recognition API of module 110) and a dependent variable (i.e., a final empathy confidence score). The empathy confidence determination module 112 uses a linear classification model in order to determine a facial empathy score based on weighing each emotion, and an overall empathy confidence score based on weighing the three key factors: voice empathy score, keyword empathy score, and facial empathy score.

Below is Table 1 providing exemplary voice subscores, facial subscores, and keyword subscores as input for, and corresponding empathy score as output from, the linear classification model:

TABLE 1

| INPUT | | | OUTPUT |
|---|---|---|---|
| Voice Subscore | Facial Subscore | Keyword Subscore | Empathy Score |
| 0.337123827 | 0.641259558 | 1 | 0 |
| 0.745032124 | 0.750150183 | 0 | 0 |
| 0.761768277 | 0.696631457 | 1 | 1 |
| 0.872892544 | 0.221971155 | 0 | 0 |
| 0.976507097 | 0.946361657 | 0 | 0 |
| 0.609151004 | 0.897494718 | 1 | 1 |
| 0.648344707 | 0.284330816 | 0 | 0 |
| 0.469374865 | 0.363142932 | 0 | 0 |

Figure 4:
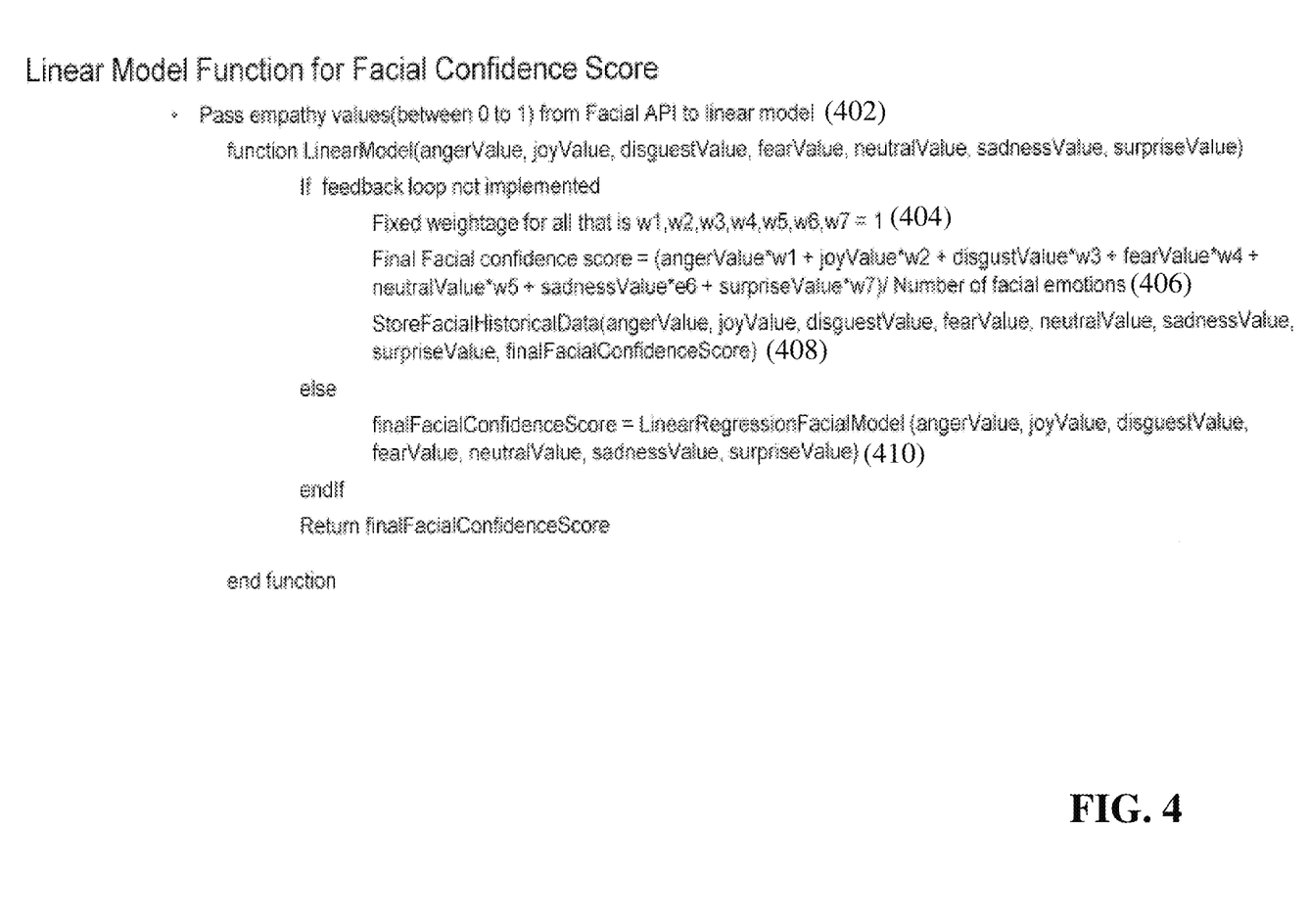
FIG. 4 is an example function workflow for the linear classification model when determining the facial empathy score.

FIG. 4 is an example function workflow for the linear classification model when determining the facial empathy score. As shown in FIG. 4, the facial analysis module 110 passes (402) empathy values (i.e., values between 0 and 1) from the facial emotion recognition API to the linear classification model of the module 112, which can perform one of two different analyses based upon whether the system 100 has implemented an artificial-intelligence based feedback loop to refine the results of the facial empathy score and the overall empathy confidence score using a neural network/regression technique (described in detail below).

Generally, if the system 100 does not implement the feedback loop, the empathy confidence determination module 112 applies a fixed weight (404) to each of the emotion values determined via the facial emotion recognition API and determines (406) a final facial empathy confidence score by multiplying each emotion value by its fixed weight, adding the emotion values together, and dividing the total by the number of emotions detected. The module 112 then stores (408) the emotion values and the final facial empathy confidence score in the database 116.

Figure 5:
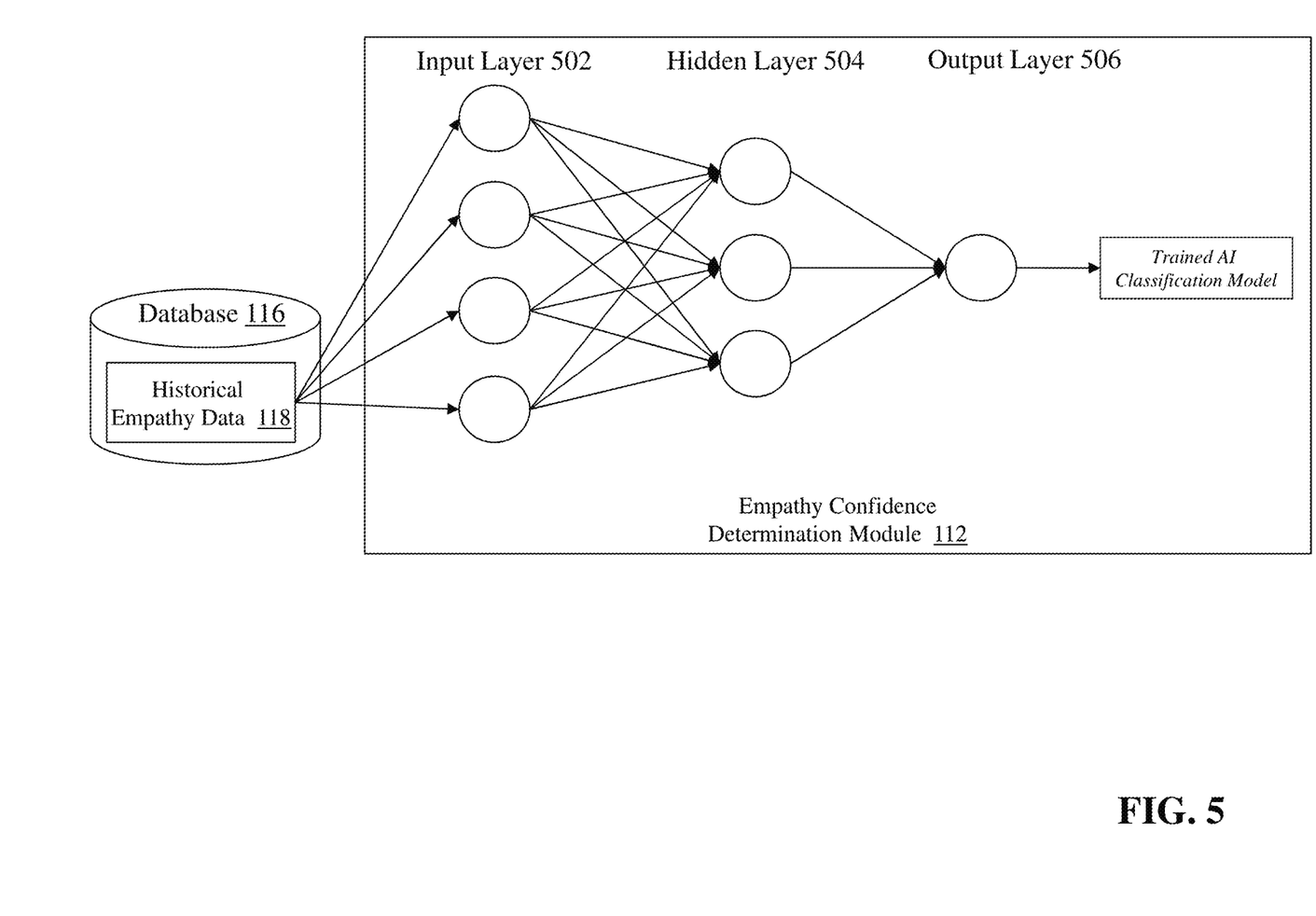
FIG. 5 is a diagram of an exemplary artificial intelligence linear regression classification model implemented by the empathy confidence determination module.

However, if the feedback loop is implemented, the empathy confidence determination module 112 determines (410) the final facial empathy confidence score by executing an artificial intelligence linear regression classification model, using the emotion values as input and leveraging historical empathy data 118 stored in database 116 to train the artificial intelligence linear regression model so that it generates a more accurate facial empathy confidence score. FIG. 5 is a diagram of an exemplary artificial intelligence linear regression model implemented by the empathy confidence determination module 112. As shown in FIG. 5, the module 112 trains the linear regression classification model using a neural network comprising layers of nodes that are connected to each other. Generally, each node has values between 0.0 and 1.0. The nodes are linked by connections which have a 'weight' assigned to them. Initial weights are set randomly. Each node has an activation function with 'standardizes' the output of that node. The neural network includes an input layer 502 that comprises a plurality of nodes each containing a historical emotion value as received from the historical empathy data 118. For example, each node in the input layer 502 can correspond to one emotion value as determined via the facial emotion recognition API. The neural network applies a weight value to each input value (indicated by the arrow connecting an input node to a node in the hidden layer 504) to arrive at an intermediate value in the hidden layer. Generally, there is more than one hidden layer. Then, the neural network applies another weight value to each value in the hidden layer 504 to arrive at an output value in the output layer 506 that indicates the facial emotion confidence value (e.g., between 0 and 1) based upon the emotion values used as input. In some embodiments, the dataset is iterated for a finite number of times. After every iteration, the weights between nodes are adjusted to reduce a cost function. Typically, a plurality of GPUs are used in tandem to execute on larger historical datasets.

Figure 6:
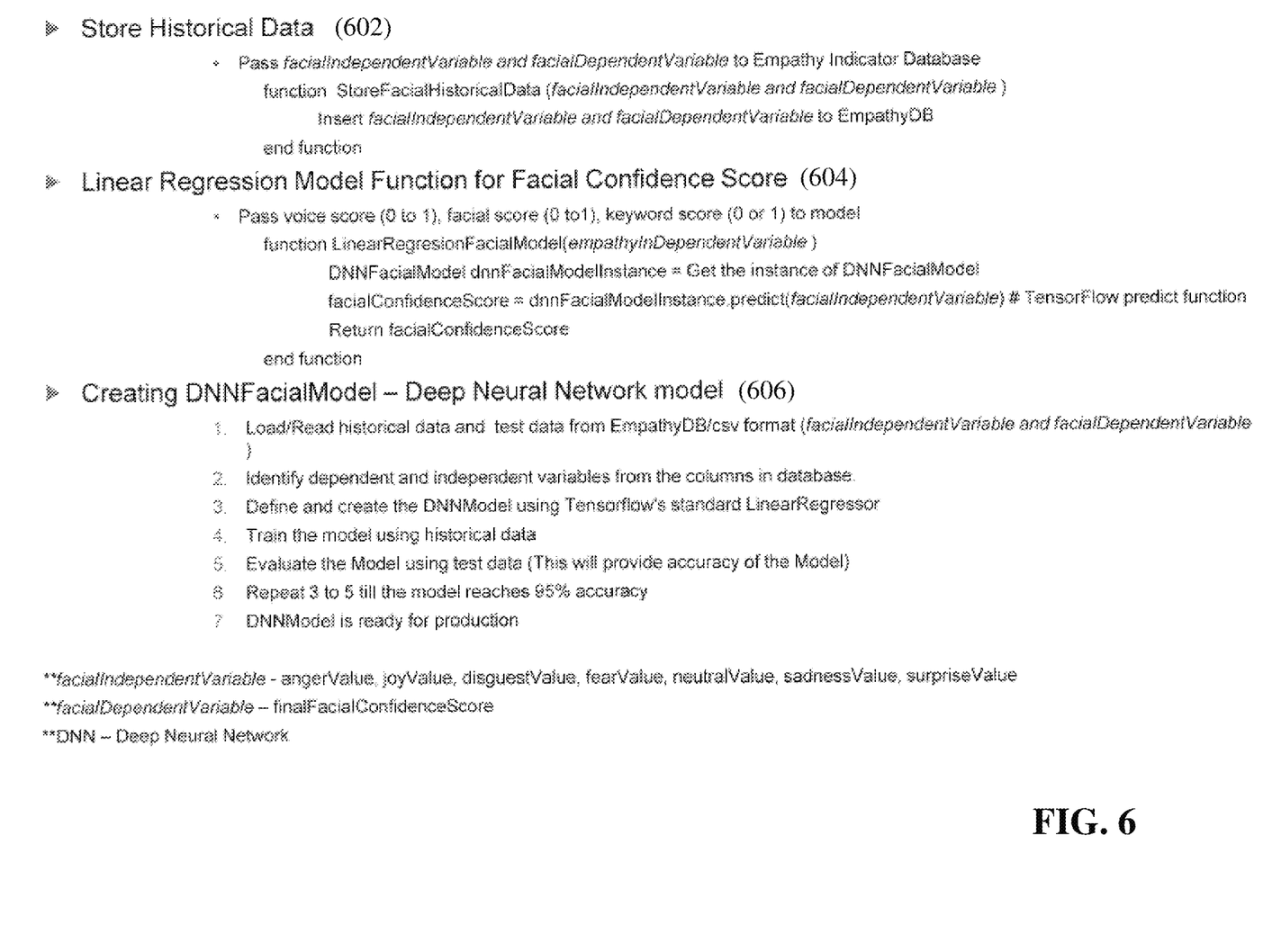
FIG. 6 is an example function workflow for the artificial intelligence linear regression classification model when determining the facial empathy confidence score.
Figure 7:
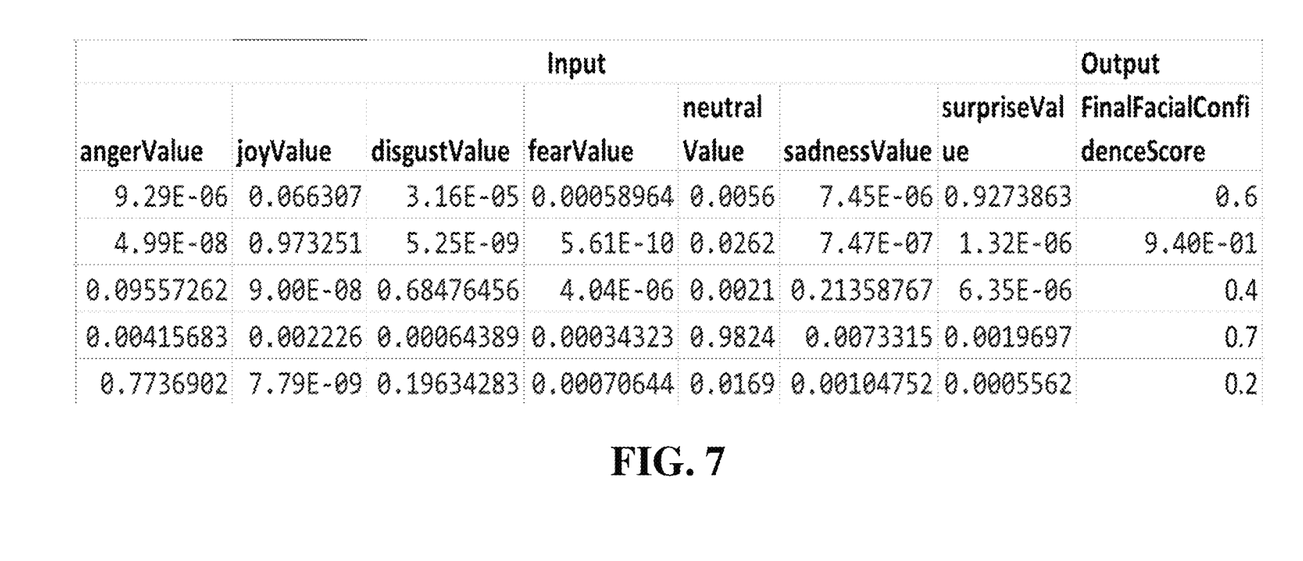
FIG. 7 is exemplary input and output data used to generate facial empathy scores.

FIG. 6 is an example function workflow for the artificial intelligence linear regression classification model when determining the facial empathy confidence score. As shown in FIG. 6, the empathy confidence determination module 112 stores (602) historical empathy data relating to, e.g., prior determinations by the system 110 with respect to facial emotions and facial empathy scores in database 116 and executes (604) an instance of the linear regression classification model for facial empathy in order to generate the facial empathy confidence score. As shown in step 606, the module 112 retrieves historical facial emotion and empathy score data from database 116 and trains the classification model using the historical data. Then, the module 112 repeatedly executes the trained classification model against a small set of test data to increase the accuracy of the model's output as more executions of the model take place. For example, because the module 112 has both the inputs and corresponding facial empathy score from the historical empathy data 118, the module 112 can determine whether the classification model is accurate (i.e., whether the facial empathy score generated by the model is sufficiently similar to the actual facial empathy score). Once the accuracy reaches a predetermined threshold (e.g., 95%), the classification model is considered as trained and ready to be used against production facial empathy data to determine facial empathy scores for users during their communication sessions. FIG. 7 is exemplary input and output data used by the module 112 to generate facial empathy scores.

Turning back to FIG. 2, once the facial empathy score has been generated by the facial analysis module 110, the empathy confidence determination module 112 generates (214) an overall empathy confidence score for the user 101 based upon the voice empathy score, the keyword empathy score, and the facial empathy score as determined above. The overall empathy confidence score generally reflects whether the user 101 is displaying empathic behavior toward the customer during the communication session—and the user's 101 vocal cues, choice of words, and facial expressions each contribute to the determination of empathy. In some embodiments, the empathy confidence determination module 112 uses a similar process to generate the overall empathy confidence score. FIG. 8 is an example function workflow for the artificial intelligence linear regression classification model when determining the overall empathy confidence score. As shown in FIG. 8, the empathy confidence determination module 112 stores (802) historical empathy data relating to, e.g., prior determinations by the system 110 with respect to overall empathy confidence scores in database 116 and executes (804) an instance of the linear regression classification model for facial empathy in order to generate the overall empathy confidence score. As shown in step 806, the module 112 retrieves historical data for the voice empathy scores, keyword empathy scores, and facial empathy scores and corresponding overall empathy confidence scores from database 116 and trains the classification model using the historical data. Then, the module 112 repeatedly executes the trained classification model against a small set of test data to increase the accuracy of the model's output as more executions of the model take place. For example, because the module 112 has both the inputs and corresponding overall empathy score from the historical empathy data 118, the module 112 can determine whether the classification model is accurate (i.e., whether the overall empathy score generated by the model is sufficiently similar to the actual overall empathy score). Once the accuracy reaches a predetermined threshold (e.g., 95%), the classification model is considered as trained and ready to be used against production voice empathy scores, keyword empathy scores, and facial empathy scores to determine overall empathy scores for users during their communication sessions. Exemplary overall empathy score data is shown in Table 1 above.

Once the empathy confidence determination module 112 has generated the overall empathy confidence score, the module 112 compares the determined score with a predefined threshold value to determine whether it is likely that the user 101 is being empathetic during the communication session. For example, if the user's overall empathy confidence score exceeds the threshold, then the module 112 can determine that the user is being sufficiently empathetic and the module 112 may take no further action. However, if the user's overall empathy confidence score falls below the threshold, the module 112 can take corrective action to change the user's behavior. Such corrective action is intended to improve the level of empathy exhibited by the user and to help train the user in certain actions or behaviors accordingly.

The empathy confidence determination module 112 generates (216) recommended changes to at least one of (i) a physical expression of the user's 101 face or (ii) vocal cues of the user's speech based upon the overall empathy confidence score. In some embodiments, the module 112 further generates recommended changes based upon one or more of the user's voice empathy score, keyword empathy score, or facial empathy score.

For example, if the module 112 determines that the user has fallen below the overall empathy confidence score threshold, the module 112 can determine that the user failed to include sufficient empathy keywords in his or her communications with a customer. In another example, the module 112 can determine that the user's vocal cues did not reflect a desired level of empathy, or that the user's facial expressions while speaking to the customer indicated a low level of empathy with the customer. Therefore, the module 112 can generate graphical or audio recommendations for the user that suggest different behaviors to use on the next communication session. For example, the module 112 can select one or more pictures of facial expressions that are associated with high levels of empathy—and generate a graphical user interface that displays the pictures (including, in some embodiments, a first picture of a similar facial expression to the user's expression that shows a lack of empathy and a second picture of the desired facial expression). In another example, the module 112 can generate one or more words or phrases that are associated with high levels of empathy—and create a list of the words/phrases for display to the user.

The empathy confidence determination module 112 then executes (218) a computer software application on the remote computing device 102 that displays the recommended changes to the user 101. For example, when the user has completed the communication session, the module 112 can automatically launch a software application (e.g., a browser) on the remote computing device 102 that displays the recommended changes to the user—so that the user can review the changes in advance of his or her next voice call or video call. In another example, the module 112 can evaluate the user's empathy confidence score in real-time during the communication session, and automatically launch the software application on the remote computing device 102 while the call is underway to suggest alternative behaviors to the user 101—so that the user can change his or her behavior during the call, which may result in an improved customer experience.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automated execution of computer software based upon determined empathy of a communication participant using artificial intelligence-based speech recognition and facial recognition techniques, the system comprising:

a remote computing device of the communication participant; and a server computing device coupled to the remote computing device via a network connection, the server computing device comprising a memory for storing programmatic instructions and a processor that executes the programmatic instructions to:

capture a digitized voice segment from the remote computing device, the digitized voice segment corresponding to speech submitted by the communication participant during a digital communication session;

analyze one or more vocal cues of a waveform of the digitized voice segment to generate a voice empathy score for the digitized voice segment;

convert the speech in the digitized voice segment into text and extract a set of keywords from the text;

determine one or more empathy keywords in the extracted set of keywords and generate a keyword empathy score based upon the empathy keywords;

capture, via a camera coupled to the remote computing device, digitized images of the communication participant's face during the digital communication session;

analyze one or more physical expressions of the communication participant's face in the digitized images to identify one or more emotions of the communication participant and generating a facial empathy score for the digitized images;

generate, using an artificial intelligence classification model, an overall empathy confidence score for the communication participant based upon the voice empathy score, the keyword empathy score, and the facial empathy score;

generate recommended changes to (i) a physical expression of the communication participant's face or (ii) vocal cues of the communication participant's speech based upon the overall empathy confidence score; and execute a computer software application that displays the recommended changes to the communication participant.

2. The system of claim 1, wherein generating an overall empathy confidence score comprises:

generating, using the classification model, a first empathy confidence score for the participant based upon the voice empathy score, the keyword empathy score, and the facial empathy score;

if the first empathy confidence score is below a predetermined threshold:

train, using an artificial intelligence neural network executing on the server computing device, a second classification model using historical data comprising voice empathy scores, keyword empathy scores, and facial empathy scores, and overall empathy confidence scores previously determined by the server computing device; and execute the trained second classification model using the voice empathy score, the keyword empathy score, and the facial empathy score as input to generate the overall empathy confidence score for the participant.

3. The system of claim 2, wherein executing the trained second classification model generates an accuracy value associated with the overall empathy confidence score.

4. The system of claim 1, wherein capturing a digitized voice segment comprises:

capturing a bitstream containing the digitized voice segment from the remote computing device as a speech file; and adjusting compression of the bitstream containing the digitized voice segment to enhance audio quality of the bitstream.

5. The system of claim 1, wherein the one or more vocal cues of the waveform comprise a tone attribute, a pitch attribute, a volume attribute, and a speed attribute.

6. The system of claim 5, wherein the server computing device analyzes one or more frequencies associated with the waveform to determine the one or more vocal cues of the waveform.

7. The system of claim 1, wherein converting the digitized voice segment into text comprises executing a speech recognition engine on a digital file containing the digitized voice segment to generate the text.

8. The system of claim 7, wherein the server computing device analyzes the text using a grammar recognition engine to validate the text.

9. A computerized method of automated execution of computer software based upon determined empathy of a communication participant using artificial intelligence-based speech recognition and facial recognition techniques, the method comprising:

capturing, by a server computing device, a digitized voice segment from a remote computing device, the digitized voice segment corresponding to speech submitted by a communication participant during a digital communication session;

analyzing, by the server computing device, one or more vocal cues of a waveform of the digitized voice segment to generate a voice empathy score for the digitized voice segment;

converting, by the server computing device, the speech in the digitized voice segment into text and extract a set of keywords from the text;

determining, by the server computing device, one or more empathy keywords in the extracted set of keywords and generate a keyword empathy score based upon the empathy keywords;

capturing, by the server computing device via a camera coupled to the remote computing device, digitized images of the communication participant's face during the digital communication session;

analyzing, by the server computing device, one or more physical expressions of the communication participant's face in the digitized images to identify one or more emotions of the communication participant and generating a facial empathy score for the digitized images;

generating, by the server computing device using an artificial intelligence classification model, an overall empathy confidence score for the communication participant based upon the voice empathy score, the keyword empathy score, and the facial empathy score;

generating, by the server computing device, recommended changes to (i) a physical expression of the communication participant's face or (ii) vocal cues of the communication participant's speech based upon the overall empathy confidence score; and executing, by the server computing device, a computer software application that displays the recommended changes to the communication participant.

10. The method of claim 9, wherein generating an overall empathy confidence score comprises:

generating, by the server computing device using the classification model, a first empathy confidence score for the participant based upon the voice empathy score, the keyword empathy score, and the facial empathy score;

if the first empathy confidence score is below a predetermined threshold:

training, by the server computing device using an artificial intelligence neural network executing on the server computing device, a second classification model using historical data comprising voice empathy scores, keyword empathy scores, and facial empathy scores, and overall empathy confidence scores previously determined by the server computing device; and executing, by the server computing device, the trained second classification model using the voice empathy score, the keyword empathy score, and the facial empathy score as input to generate the overall empathy confidence score for the participant.

11. The method of claim 10, wherein executing the trained second classification model generates an accuracy value associated with the overall empathy confidence score.

12. The method of claim 9, wherein capturing a digitized voice segment comprises:
   capturing, by the server computing device, a bitstream containing the digitized voice segment from the remote computing device as a speech file; and
   adjusting, by the server computing device, compression of the bitstream containing the digitized voice segment to enhance audio quality of the bitstream.

13. The method of claim 9, wherein the one or more vocal cues of the waveform comprise a tone attribute, a pitch attribute, a volume attribute, and a speed attribute.

14. The method of claim 13, wherein the server computing device analyzes one or more frequencies associated with the waveform to determine the one or more vocal cues of the waveform.

15. The method of claim 9, wherein converting the digitized voice segment into text comprises executing a speech recognition engine on a digital file containing the digitized voice segment to generate the text.

16. The method of claim 15, wherein the server computing device analyzes the text using a grammar recognition engine to validate the text.

* * * * *